Feb. 13, 1945. E. D. EVERY 2,369,222
WELL SCRAPING TOOL
Filed May 21, 1942 2 Sheets—Sheet 2

INVENTOR.
ELMER D. EVERY, DECEASED,
SARA F. EVERY, VIRGIL F. EVERY
& PEOPLES TRUST COMPANY
OF BERGEN COUNTY
EXECUTORS.
BY
*Clark & Ott*
ATTORNEYS Patented Feb. 13, 1945

2,369,222

UNITED STATES PATENT OFFICE 2,369,222

WELL SCRAPING TOOL

Elmer D. Every, deceased, late of Rochelle Park, N. J., by Sara F. Every and Virgil F. Every, Rochelle Park, and Peoples Trust Company of Bergen County, Hackensack, N. J., executors; assignors, by mesne assignments, to Artesian Well & Equipment Co., Inc., Rochelle Park, N. J., a corporation of New Jersey Application May 21, 1942, Serial No. 443,936

2 Claims. (Cl. 166—18)

This invention relates to well tools and has particular reference to a tool for brushing and scraping the walls of artesian or other wells to remove drillings, rubble and agglomerate adhering thereto so as to uncover and open up the fissures in the subterranean strata.

The invention has in view a well tool of the indicated character including outwardly projecting spring metal tines so constructed and arranged as to permit of flexing of the same in opposite directions.

A further object of the invention resides in the provision of spring metal tines having headed outer ends of relatively harder metal than that of the tines in order to effectively resist the wear to which they are subjected.

The invention also provides improved means for detachably mounting and securing the tines in radial outwardly projecting relation in order that the same may be expeditiously removed and replaced when worn.

With the foregoing and other objects in view, reference is now made to the following specification and the accompanying drawings in which there is illustrated the preferred embodiments of the invention.

Figure 1:
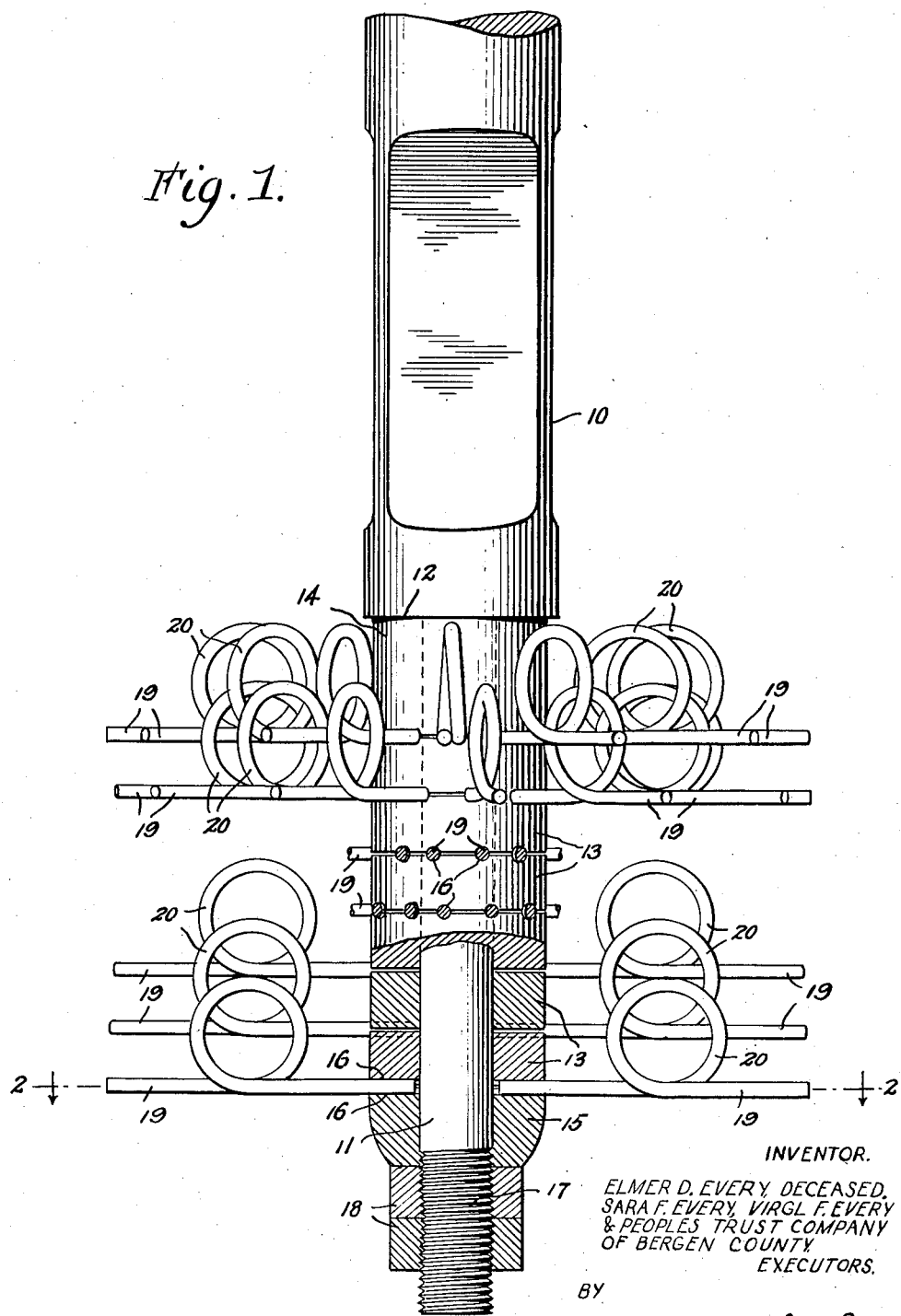
Fig. 1 is a side view of a well tool constructed in accordance with the invention, with parts broken away and shown in section and with certain of the tines omitted for the sake of clearness.
Figure 2:
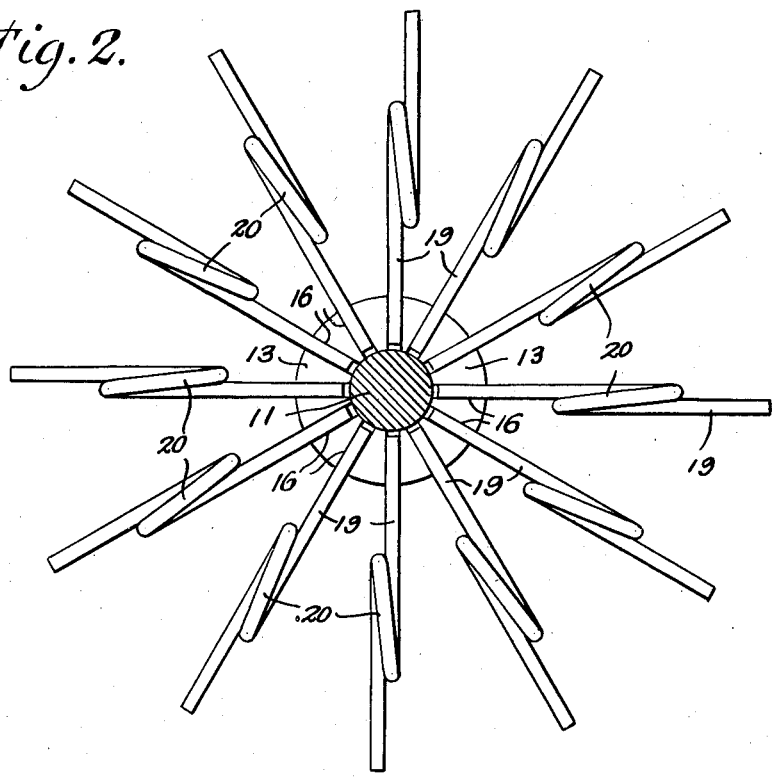
Fig. 2 is a horizontal sectional view taken approximately on the line 2—2 of Fig. 1.
Figure 3:
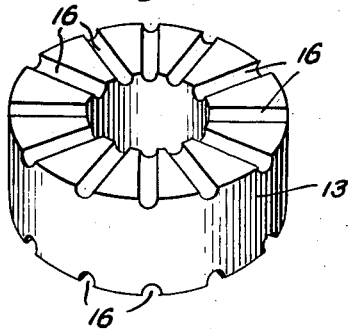
Fig. 3 is a perspective view of one of the tubular tine clamping sections.
Figure 4:
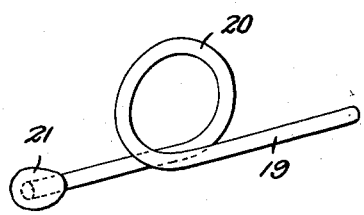
Fig. 4 is a perspective view of a modified form of tine.

Referring to the drawings by characters of reference, the tool includes a shaft or rod section 10 which is coupled to the usual well rod operatively connected with a drilling rig for raising and lowering the tool for imparting a brushing or scraping action thereto.

The shaft or rod section 10 is provided with a reduced lower end 11 defining a shoulder 12 and which reduced end 11 has fitted thereon a plurality of longitudinally spaced tubular sections 13 and upper and lower collars 14 and 15, the confronting faces of which are provided with mating circumferentially spaced radially disposed grooves 16 which open through the outer faces thereof. The lower extremity of the reduced lower end 11 protruding beyond the lower collar 15 is treaded as at 17 to receive a pair of lock nuts 18 for securing the sections 13 and the collars 14 and 15 on the reduced lower end 11 with the upper collar 14 impinged against the shoulder 12.

In order to provide means for brushing and scraping the walls of the well to remove drillings, rubble and agglomerate adhering thereto, the tool includes a plurality of spring metal tines 19, one being provided for each mating pair of grooves 16 in which grooves the inner ends of the tines are arranged and secured by the clamping action of the nuts 18. Each of the tines 19 is provided with an upstanding loop 20 which is located in spaced relation with the sleeves 13 and substantially medially of the protruding portion of the length of the tines. The tines project radially outward from the tubular sections and the tines of one of the spaced series of circumferential rows are staggered with reference to the tines of the adjacent row so that the outer free terminals thereof engage substantially with the entire surface of the wall of the well upon each reciprocation of the tool in the well. This also provides a clearance for the loops of one row of tines with reference to the tines of an adjacent row, where, as shown, the loops of the tines exceed the spacing of the adjacent rows of tines.

The tines 19 are preferably of circular formation in cross section and the grooves 16 are of such a depth as to provide a space between adjacent sections 13 so as to set up a positive clamping action for retaining the tines in the grooves against radial displacement or turning movement when the nuts 18 are tightened on the treaded extremity 17. Under this construction and arrangement, the tines 19 may be readily removed and replaced when worn or damaged.

The tines 19 may be provided at their outer ends with a head 21 of relatively harder metal than that of the tines, such as hard facing material, steel alloys and the like, in order to effectively resist the wearing action against subterranean rock strata.

When in use it is apparent that as the tool is reciprocated in the well, the tines will be flexed in opposite directions and the loops 20 will contract upon movement in one direction and expand upon movement in the opposite direction to increase the resiliency to absorb the strains and stresses to which the tines are subjected and to avoid bending of the tines at their juncture with the clamping sections 13.

What is claimed is:

1. A well scraping tool including a rod, a plurality of tubular sections fitted on said rod, a plurality of circumferentially spaced outwardly projecting tines having their inner ends disposed between said sections, said tines being formed of spring metal and having loops provided therein intermediate their ends and spaced from said tubular sections so that said loops do not contact with said tubular sections during flexing of the tines to thereby permit of flexing of the tines in opposite directions throughout their lengths and the contraction of the loops when the tines are flexed in one direction and the expansion of the loops when the tines are flexed in the opposite direction, and said tines having heads at the free outer ends thereof of relatively harder wear resisting metal for scraping action against subterranean rock strata and means for securing the tubular sections on said rod and the inner ends of the tines between the sections.

2. A well scraping tool including a rod, a plurality of tubular sections fitted on said rod, a plurality of circumferencially spaced outwardly projecting tines having their inner ends disposed between said sections, said tines being formed of spring metal and having loops provided therein intermediate their ends and spaced from said tubular sections so that said loops do not contact with said tubular sections during flexing of the tines to thereby permit of flexing of the tines in opposite directions throughout their lengths and the contraction of the loops when the tines are flexed in one direction and the expansion of the loops when the tines are flexed in the opposite direction, and means for securing the tubular sections on said rod and the inner ends of the tines between the sections.

SARA F. EVERY,
VIRGIL F. EVERY,
PEOPLES TRUST COMPANY OF
BERGEN COUNTY,
By O. L. CASSI, JR.
*Trust Officer,*
*Executors of the Last Will and Testament of Elmer D. Every, Deceased.*